US 12,074,724 B2

(12) United States Patent
Kulkarni et al.

(10) Patent No.: US 12,074,724 B2
(45) Date of Patent: Aug. 27, 2024

(54) SYSTEM AND METHOD FOR SERVICING ASSETS IN A BUILDING

(71) Applicant: Honeywell International Inc., Charlotte, NC (US)

(72) Inventors: Amit B. Kulkarni, Medina, MN (US); Deepthi Sethuraman, Bengaluru (IN); Jayaprakash Meruva, Bangalore (IN); Umesh Hosamani, Bengaluru (IN)

(73) Assignee: Honeywell International Inc., Charlotte, NC (US)

( * ) Notice: Subject to any disclaimer, the term of this patent is extended or adjusted under 35 U.S.C. 154(b) by 9 days.

(21) Appl. No.: 17/473,680

(22) Filed: Sep. 13, 2021

(65) Prior Publication Data

US 2023/0081159 A1    Mar. 16, 2023

(51) Int. Cl.
*H04L 12/28* (2006.01)
*G05B 15/02* (2006.01)
*H04W 84/04* (2009.01)

(52) U.S. Cl.
CPC .......... *H04L 12/2823* (2013.01); *G05B 15/02* (2013.01); *H04W 84/042* (2013.01)

(58) Field of Classification Search
USPC ........................................................ 700/276
See application file for complete search history.

(56) References Cited

U.S. PATENT DOCUMENTS

| 9,592,964 B2 | 3/2017 | Göllü | |
| 2013/0109375 A1 * | 5/2013 | Zeiler | G01S 19/16 |
| | | | 455/552.1 |

(Continued)

FOREIGN PATENT DOCUMENTS

| CN | 105773615 B | 5/2018 | |
| CN | 111624994 A * | 9/2020 | ........... G05B 13/042 |

OTHER PUBLICATIONS

Lienau, "Equipment Management and the Possibilities of 5G Tech" Published Feb. 7, 2020 (https://onekeyresources.milwaukeetool.com/en/5g-wireless-equipment-management) accessed at: https://web.archive.org/web/20220926192043/https://onekeyresources.milwaukeetool.com/en/5g-wireless-equipment-managem (Year: 2020).*

(Continued)

*Primary Examiner* — Emilio J Saavedra
(74) *Attorney, Agent, or Firm* — Seager, Tufte & Wickhem, LLP (57) ABSTRACT

Each of a plurality of assets within a building are configured to access a cellular network in order to ascertain its specific location, to perform self-diagnostics on itself, and to transmit an assistance request when the self-diagnostics indicates a potential problem. The assistance request may include the specific location of the asset and an indication of the potential problem. A server is operably couplable to the cellular network and is configured to receive the assistance requests from the assets, formulate a service request for responding to at least some of the received assistance requests, assign each of the service requests to a corresponding one of one or more automated asset maintenance assistants, and transmit each of the service requests to the assigned automated asset maintenance assistant instructing the assigned automated asset maintenance assistant to respond to the corresponding assistance request.

20 Claims, 5 Drawing Sheets

(56) References Cited

U.S. PATENT DOCUMENTS

| | | | | |
|---|---|---|---|---|
| 2014/0236353 | A1* | 8/2014 | Annaz | B25J 19/066 |
| | | | | 700/253 |
| 2017/0286916 | A1* | 10/2017 | Skiba | B25J 9/1689 |
| 2019/0102753 | A1* | 4/2019 | Harrison | H04L 67/125 |
| 2019/0141295 | A1* | 5/2019 | Lazar | H04N 7/183 |
| 2019/0387291 | A1 | 12/2019 | Adiletta et al. | |
| 2020/0081439 | A1* | 3/2020 | Mukherjee | B25J 9/023 |
| 2020/0174464 | A1 | 6/2020 | Cella et al. | |
| 2020/0219332 | A1* | 7/2020 | Shekar | G07C 5/008 |
| 2021/0109493 | A1* | 4/2021 | Poornachandran | |
| | | | | G05B 19/0423 |
| 2021/0278495 | A1* | 9/2021 | Wendt | G01C 21/206 |
| 2022/0018950 | A1* | 1/2022 | Schmitz | G01S 13/865 |

OTHER PUBLICATIONS

Ericsson, "5G Positioning: What you Need to Know," 2020, 10 pages.
Honeywell, HBT IPA Intellectual Property Center of Excellence, Novelty Search Report (IDF-223485), 2021, 13 pages.
Hu, Mobile Edge Computing: A Key Technology towards 5G, Sep. 2015, 16 pages.
IDF-22345 Inventor Review—AOA Patentability Search Results Analysis (1), 2021, 2 pages.
Ping, "Mobile Robot Navigation Path Algorithm in 3D Industrial Internet of Thing (IOT) Environment Based on 5G Mobile Communication", 2019, 9 pages.
Slamich, "The Impact of 5G on Location Technology: What's Real and What's Hype?", Feb. 17, 2021, 10 pages.

\* cited by examiner

SYSTEM AND METHOD FOR SERVICING ASSETS IN A BUILDING

TECHNICAL FIELD

The present disclosure pertains generally to systems and methods for servicing assets within a building.

BACKGROUND

Buildings include a number of assets that can contribute to the functionality of the buildings. As an example, a building includes a number of Heating, Ventilating and Air Conditioning (HVAC) assets that together form the building's HVAC system. Buildings can include security systems, access control systems and lighting systems. It will be appreciated that each of these systems may include a variety of different assets. Buildings can also include office appliances such as, for example, copy machines, scanners, facsimile machines, coffee makers, dishwashers, and vending machines to name a few. In some cases, some assets may utilize consumables, which may need to be restocked or collected. For example, copy machines may utilize paper and ink or toner, vending machines may dispense products and collect coins, HVAC systems may consume filters. These are just examples. Regardless of the type of system, the assets can degrade in performance over time and can require maintenance, repair and/or restocking. A need remains for systems and methods for efficiently servicing assets within a building.

SUMMARY

This disclosure relates generally to servicing assets within a building. An example may be found in a system that includes a plurality of cellular network-enabled assets in a building. In this example, each of the plurality of cellular network-enabled assets are configured to: access a cellular network in order to ascertain a specific location of the cellular network-enabled asset in the building; perform self-diagnostics on the cellular network-enabled asset; and transmit an assistance request via the cellular network when the self-diagnostics indicates a potential problem associated with the cellular network-enabled asset. The assistance request may include the specific location of the cellular network-enabled asset in the building and an indication of the potential problem associated with the cellular network-enabled asset. The illustrative system includes a server that is operably couplable to the cellular network and that is configured to receive the assistance requests from the plurality of cellular network-enabled assets, formulate a service request for responding to at least some of the received assistance requests, assign each of the service requests to a corresponding one of one or more automated asset maintenance assistants, and transmit each of the service requests to the assigned automated asset maintenance assistant instructing the assigned automated asset maintenance assistant to respond to the corresponding assistance request.

Another example may be found in a system for servicing assets in a building. This illustrative system includes a plurality of 5G-enabled assets that are each configured to: utilize a 5G network to determine its location; perform self-diagnostics; and transmit an assistance request via the 5G network when a potential problem is detected by the self-diagnostics. The illustrative system includes a plurality of mobile asset maintenance robots, each of the plurality of mobile asset maintenance robots is configured to perform one or more tasks, where at least some of the plurality of mobile asset maintenance robots are configured to perform one or more tasks that are different than the tasks that others of the plurality of mobile asset maintenance robots are configured to perform. The illustrative system includes a computing device that is operably couplable with the 5G network and is configured to receive assistance requests for assistance from one or more of the plurality of 5G-enabled assets over the 5G network, determine which of the plurality of mobile asset maintenance robots are suited to respond to each of the received assistance requests, and, for each assistance request, transmit a service request to an assigned one of the plurality of mobile asset maintenance robots determined to be suited to respond to the assistance request, the service request instructing the assigned mobile asset maintenance robot to resolve the potential problem.

Another example may be found in a method for servicing assets in a building. A 5G network is utilized to determine a location of a 5G-enabled asset in a building. A self-diagnostics is performed on the 5G-enabled asset. An assistance request is transmitted from the 5G-enabled asset over the 5G network when a potential problem is detected by the performed self-diagnostics. The assistance request is received at a location remote from the 5G-enabled asset over the 5G network. A mobile asset maintenance robot is assigned to respond to the assistance request. A service request is transmitted to the assigned mobile asset maintenance robot, the service request instructing the assigned mobile asset maintenance robot to travel to the location of the corresponding 5G-enabled asset and perform a pre-defined Standard Operating Procedure (SOP) to resolve the potential problem.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments of the disclosure in connection with the accompanying drawings, in which.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements. The drawings, which are not necessarily to scale, are not intended to limit the scope of the disclosure. In some of the figures, elements not believed necessary to an understanding of relationships among illustrated components may have been omitted for clarity.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

Figure 1:
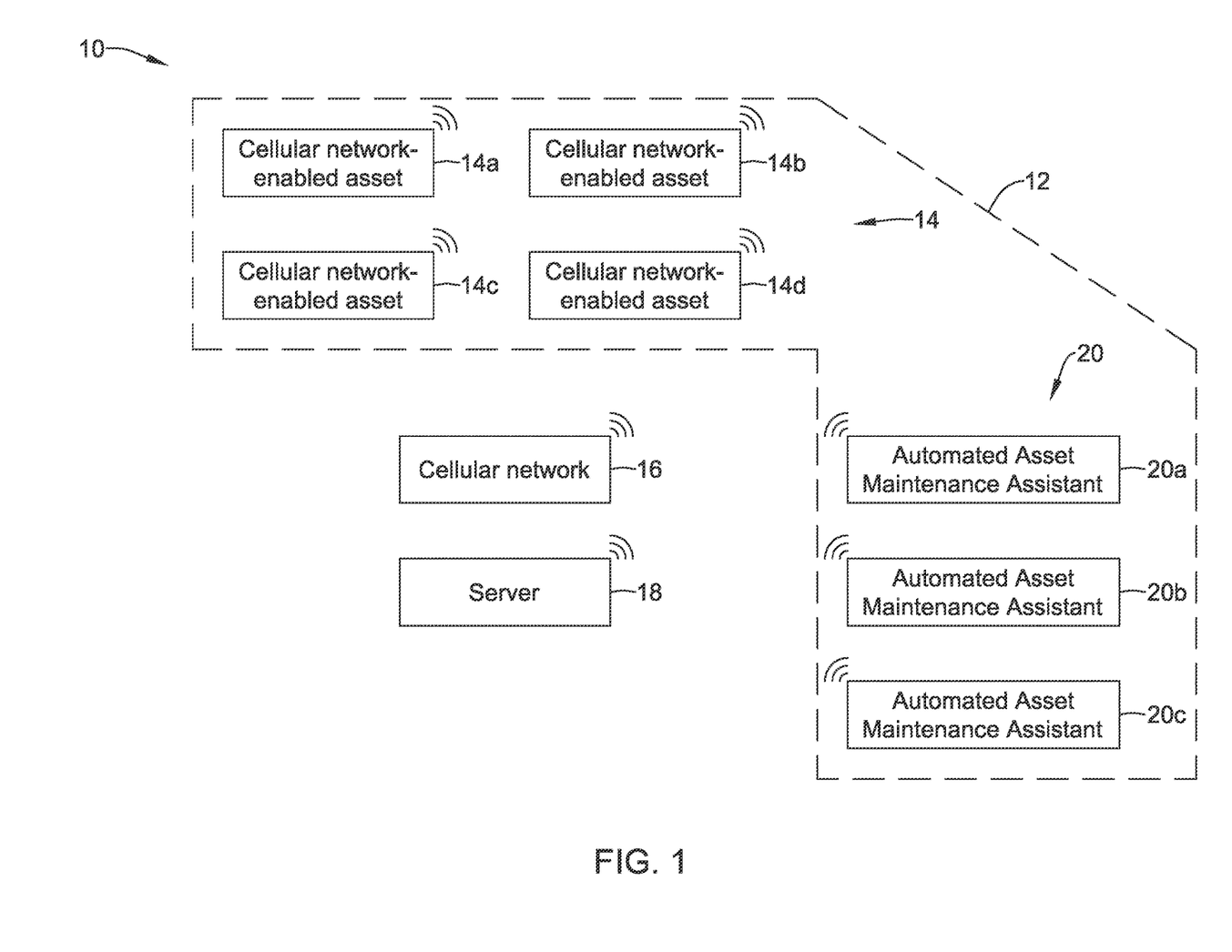
FIG. 1 is a schematic block diagram showing an illustrative system for servicing assets in a building.

FIG. 1 is a schematic block diagram of an illustrative system 10 for servicing assets in a building 12. The illustrative system 10 includes a plurality of cellular network-enabled assets 14 that are disposed within the building 12. The cellular network-enabled assets 14 are individually labeled as 14a, 14b, 14c, 14d. While a total of four cellular network-enabled assets 14 are shown, it will be appreciated that this is merely illustrative, as the building 12 may include any number of cellular network-enabled assets 14, and may in some cases include a substantially greater number of cellular network-enabled assets 14. For example, at least some of the cellular network-enabled assets 14 may be 4G-enabled. At least some of the cellular network-enabled assets 14 may be 5G-enabled, for example.

The illustrative system 10 includes a cellular network 16. In some cases, the cellular network 16 may represent a 4G network. In some instances, the cellular network 16 may represent a 5G network. The cellular network 16 may incorporate both 4G and 5G, for backward compatibility, for example. Each of the cellular network-enabled assets 14 may be configured to access the cellular network 16 in order to ascertain a specific location of the particular cellular network-enabled assets 14 in the building. The cellular network-enabled assets 14 may be configured to triangulate within the cellular network 16, for example. In some cases, particularly when the cellular network 16 is or includes a 5G cellular network, the cellular network-enabled assets 14 may be able to precisely determine their current location to a relatively high degree of accuracy.

In some cases, the cellular network-enabled assets 14 may each be configured to perform self-diagnostics on itself in order to determine the presence of a potential problem, malfunction, lack of consumable supplies and other potential problems. A variety of different self-diagnostic algorithms are known and can utilize data from one or more sensors associated with the particular cellular network-enabled asset 14 to identify the presence of a potential problem. It is contemplated that the potential problem may be a current problem and/or a predicted problem that will occur in the future. When a potential problem is found, the corresponding cellular network-enabled assets 14 may be configured to transmit an assistance request via the cellular network 16. The assistance request may include, for example, the specific location of the cellular network-enabled asset 14 in the building 12 and an indication of the potential problem associated with the cellular network-enabled asset 14. In some cases, the assistance requests may indicate an urgency of the potential problem (e.g. needs immediate servicing, will need servicing in the next week, will need servicing within a month, etc.). In some cases, the assistance requests may include an estimated time frame for when the potential problem will start to affect the functionality of the corresponding cellular network-enabled asset 14. The estimated time frame may allow the system to prioritize the servicing of the received assistance requests, and in some cases, order parts/supplies that will be need to service certain ones of the assistance requests.

The illustrative system 10 includes a server 18 that is operably couplable to the cellular network 16. The server 18 may be located within the building 12, or the server 18 may be remote from the building 12. In some cases, the server 18 may itself possess cellular network capabilities. In some cases, the server 18 may be operably coupled with a gateway device that has cellular network capabilities or can be connected to a device that has cellular network capabilities. The server 18 may be considered as being configured to receive the assistance requests that are sent out from one or more of the plurality of cellular network-enabled assets 14 and to formulate one or more service requests for responding to at least some of the received assistance requests. At least some of the service requests may include an indication of the specific location of the corresponding cellular network-enabled asset 14, an indication of the potential problem associated with the corresponding cellular network-enabled asset 14, information about the corresponding cellular network-enabled asset 14 (e.g. model number, configuration details, hardware and/or software version, network address, password, etc.), supplies and/or tools that will be need to execute the service request, and/or any other suitable information.

Formulating a service request may include determining which of a plurality of the automated asset maintenance assistants 20 should be assigned to a particular assistance request based at least in part on a current location of the automated asset maintenance assistants 20 and/or one or more capabilities of the automated asset maintenance assistants 20. While not expressly shown as being within the building 12, the automated asset maintenance assistants 20 may be present within the building 12 and thus are in position to reach the cellular network-enabled assets 14 within the building 12. In some cases, each of the automated asset maintenance assistants 20 may have the same skill sets. In some cases, at least some of the automated asset maintenance assistants 20 may have unique skill sets. Formulating a service request may include preparing additional information for the assigned automated asset maintenance assistant 20, including what tools or other supplies will be needed by the assigned automated asset maintenance assistant 20 to respond to the assistance request. Formulating a service request may include providing a route for the assigned automated asset maintenance assistant 20 to reach the corresponding cellular network-enabled asset 14. In some cases, formulating the service request may include determining an appropriate time for the assigned automated asset maintenance assistant 20 to respond to the service request. For example, a non-critical repair or replenishment may be better executed at a particular time at which one or more building systems are shut down, or are otherwise likely not in use.

The server 18 may be configured to assign each of the service requests to a corresponding one of one or more automated asset maintenance assistants 20. The automated asset maintenance assistants 20 are individually labeled as 20a, 20b, 20c. While a total of three automated asset maintenance assistants 20 are shown, it will be appreciated that this is merely illustrative, as the illustrative system 10 may include any desired number of automated asset maintenance assistants 20. The server 18 may be configured to transmit each of the service requests to the assigned automated asset maintenance assistant 20 instructing the assigned automated asset maintenance assistant 20 to respond to the corresponding assistance request. In some cases, at least some of the automated asset maintenance assistants 20 are mobile robots capable of autonomously traveling to the specific location of the corresponding cellular network-enabled asset 14 in order to respond to the corresponding assistance request.

In some cases, the server 18 may identify a corresponding Standard Operating Procedure (SOP) for at least some of the assistance requests based on the potential problem included in the corresponding assistance request. The server 18 may provide the identified SOP in the service requests that is transmitted to the assigned automated asset maintenance assistant. The SOP may identify one or more ordered steps to be taken by the assigned automated asset maintenance assistant 20 to properly respond to the corresponding assistance request. This may include steps to address the potential problem included in the corresponding assistance request and in some cases, one or more steps to test the corresponding cellular network-enabled asset 14 to help ensure the potential problem has been resolved.

Because the building 12 may include a number of different systems, it will be appreciated that the cellular network-enabled assets 14 may represent any of a variety of different types of assets. One or more of the plurality of cellular network-enabled assets 14 may be a building automation component that is part of a Heating, Ventilation, and/or Air Conditioning (HVC) system. One or more of the plurality of cellular network-enabled assets 14 may be building automation components that are part of a security system, an access control system and/or a lighting system. In some cases, one or more of the plurality of cellular network-enabled assets 14 may be an office appliance such as a printer, a coffee machine, a dishwasher, a vending machine, a copy machine, a document scanner and a facsimile machine, for example. In some cases, one or more of the plurality of cellular network-enabled assets 14 may include one or more of a pump, a fan, a valve, a sensor and a controller. These are just examples.

Figure 2:
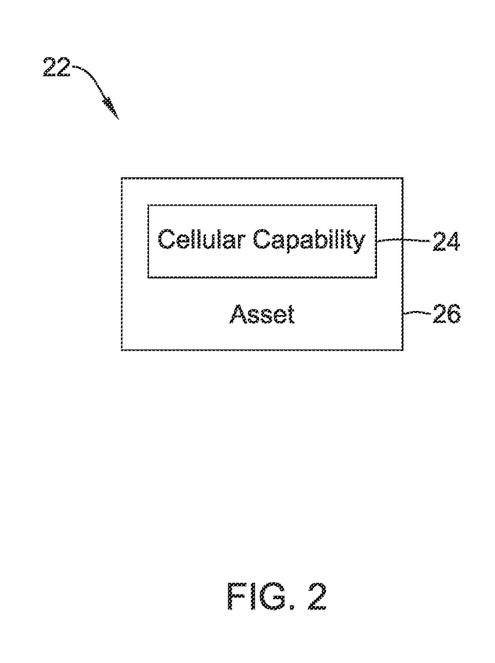
FIG. 2 is a schematic block diagram showing an illustrative asset.

FIG. 2 is a schematic block diagram of an illustrative asset 22 that may be considered as being an example of one of the cellular network-enabled assets 14. The illustrative asset 22 may be considered as being a building automation component having a cellular network capability 24 built in and housed by a housing 26 of the building automation component.

Figure 3:
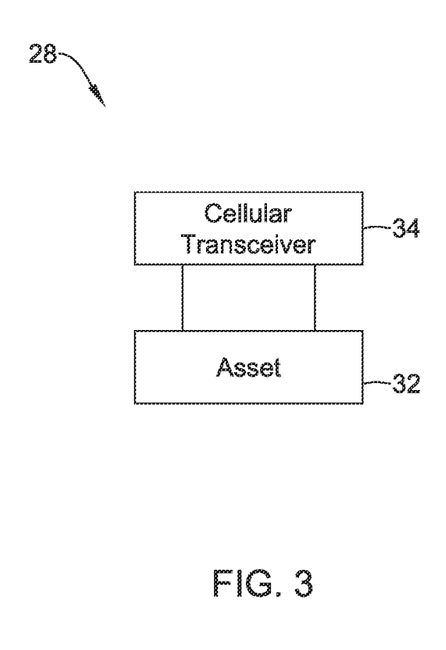
FIG. 3 is a schematic block diagram showing an illustrative asset.

FIG. 3 is a schematic block diagram of an illustrative asset 28 that may be considered as being an example of one of the cellular network-enabled assets 14. The illustrative asset 28 may be a building automation component that does not have a cellular network capability built in and housed by a housing 32 of the building automation component, but instead includes a cellular network transceiver 34 add-on that is operably coupled to the building automation component.

Figure 4:
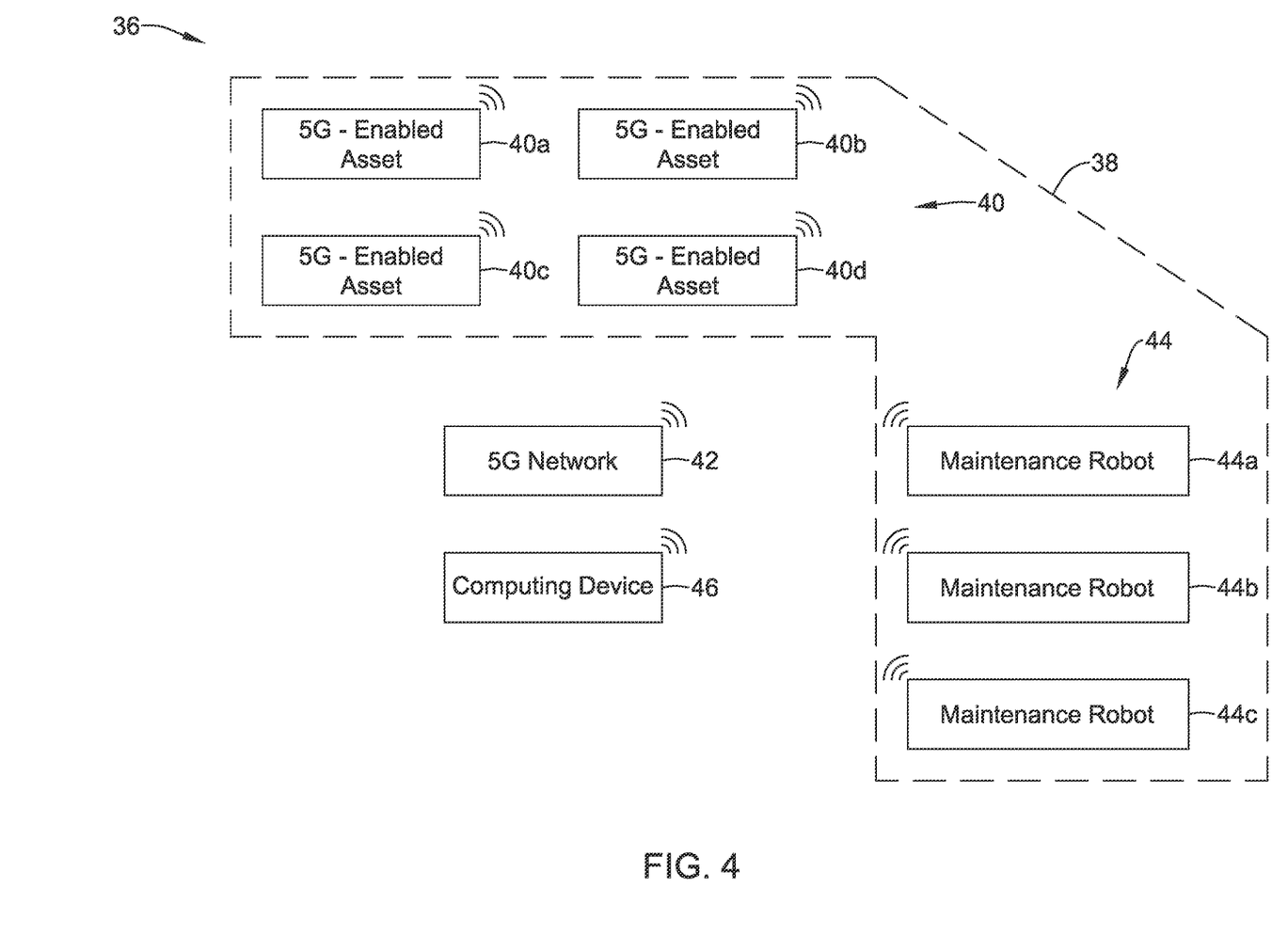
FIG. 4 is a schematic block diagram showing an illustrative system for servicing assets in a building.

FIG. 4 is a schematic block diagram of an illustrative system 36 for servicing assets in a building 38. The illustrative system 36 includes a plurality of 5G-enabled assets 40, individually labeled as 40a, 40b, 40c, 40d. While a total of four 5G-enabled assets 40 are shown, it will be appreciated that this is merely illustrative, as the building 38 may include any number of 5G-enabled assets 40. Each of the 5G-enabled assets 40 may be configured to utilize a 5G network 42 to determine its location. Each of the 5G-enabled assets 40 may be configured to perform self-diagnostics and to transmit an assistance request via the 5G network 42 when a potential problem is detected by the self-diagnostics.

The illustrative system 36 includes a plurality of mobile asset maintenance robots 44 that may be located within the building 38 or in some cases may be exterior to the building 38. The mobile asset maintenance robots 44 are individually labeled as 44a, 44b, 44c. Each of the mobile asset maintenance robots 44 may be configured to perform one or more tasks, where at least some of the plurality of mobile asset maintenance robots 44 are configured to perform one or more tasks that are different than the tasks that others of the plurality of mobile asset maintenance robots 44 are configured to perform.

The illustrative system 36 includes a computing device 46 that is operably couplable with the 5G network 42. The computing device 46 may be located within the building 38, or the computing device 46 may be remote from the building 38. In some cases, the computing device 46 may itself possess 5G cellular network capabilities. In some cases, the computing device 46 may be operably coupled with a gateway device that has 5G cellular network capabilities or can be connected to a device that has 5G cellular network capabilities. The computing device 46 may be configured to receive assistance requests for assistance from one or more of the plurality of 5G-enabled assets 40 over the 5G network 42. The computing device 46 may be configured to determine which of the plurality of mobile asset maintenance robots 44 are suited to respond to each of the received assistance requests. The computing device 46 may be configured to, for each assistance request, transmit a service request to an assigned one of the plurality of mobile asset maintenance robots 44 determined to be suited to respond to the assistance request, the service request instructing the assigned mobile asset maintenance robot 44 to resolve the potential problem. In some cases, the service request may include instructions for resolving the potential problem. The service request may alternately or additionally include directions for the assigned mobile asset maintenance robot 44 to find the corresponding 5G-enabled asset 40.

Because the building 38 may include a number of different systems, it will be appreciated that the 5G-enabled assets 40 may represent any of a variety of different types of assets. One or more of the plurality of 5G-enabled assets 40 may be a building automation component that is part of a Heating, Ventilation, and/or Air Conditioning (HVC) system. One or more of the plurality of 5G-enabled assets 40 may be building automation components that are part of a security system, an access control system and/or a lighting system. In some cases, one or more of the plurality of 5G-enabled assets 40 may be an office appliance such as a printer, a coffee machine, a dishwasher, a vending machine, a copy machine, a document scanner and a facsimile machine, for example. In some cases, one or more of the plurality of 5G-enabled assets 40 may include one or more of a pump, a fan, a valve, a sensor and a controller.

At least some of the 5G-enabled assets 40 may be building automation components that include 5G capability built into the building automation component. At least some of the 5G-enabled assets 40 may be building automation components that do not have 5G capability built into the building automation component, but the 5G-enabled component may include a 5G transceiver operably coupled to the building automation component.

Figure 5:
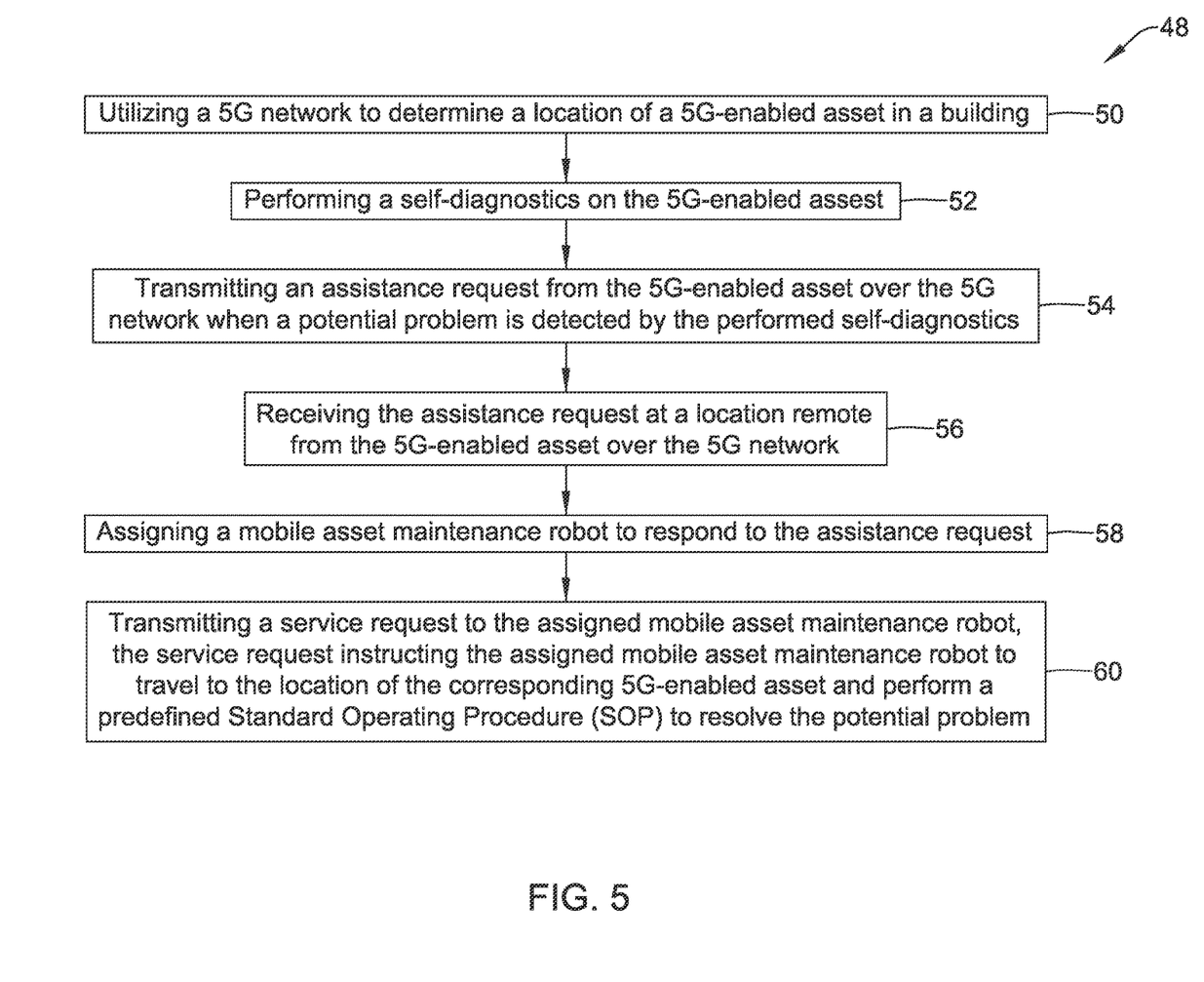
FIG. 5 is a flow diagram showing an illustrative method for servicing assets in a building.

FIG. 5 is a flow diagram showing an illustrative method 48 for servicing assets in a building. A 5G network is utilized to determine a location of a 5G-enabled asset in a building, as indicated at block 50. A self-diagnostics action is performed on the 5G-enabled asset, as indicated at block 52. An assistance request is transmitted from the 5G-enabled asset over the 5G network when a potential problem is detected by the performed self-diagnostics action, as indicated at block 54. The assistance request is received at a location remote from the 5G-enabled asset over the 5G network, as indicated at block 56. A mobile asset maintenance robot is assigned to respond to the assistance request, as indicated at block 58. A service request is transmitted to the assigned mobile asset maintenance robot, the service request instructing the assigned mobile asset maintenance robot to travel to the location of the corresponding 5G-enabled asset and perform a predefined Standard Operating Procedure (SOP) to resolve the potential problem, as indicated at block 60.

Figure 6:
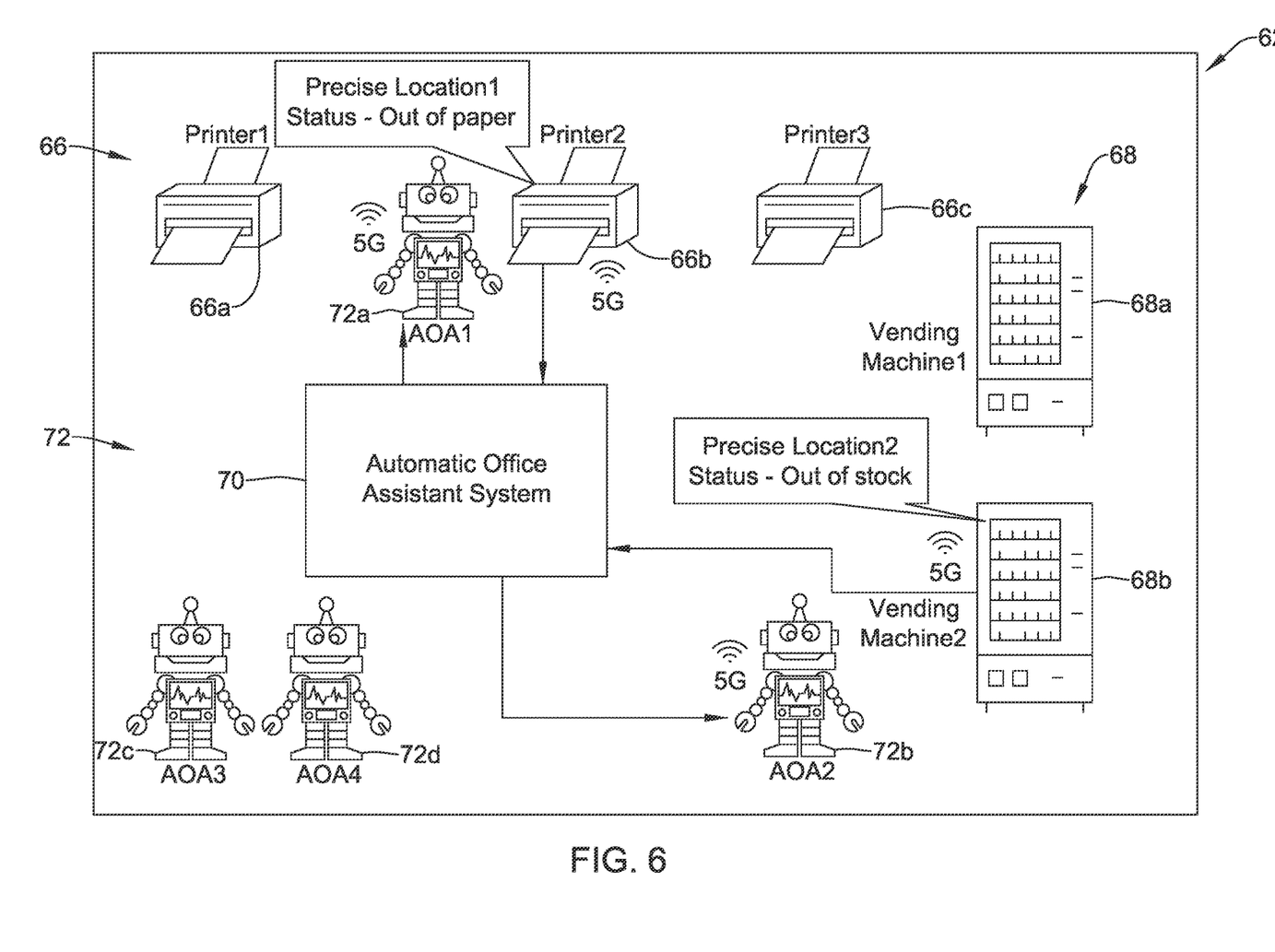
FIG. 6 is a schematic block diagram showing an illustrative example of a particular system for servicing assets in an office.

FIG. 6 is a schematic block diagram showing an illustrative example of a particular system 62 for servicing assets in an office. This particular example shows an office setup. The illustrative office includes several printers 66 that are individually labeled as 66a, 66b, 66c. While a total of three printers 66 are shown, it will be appreciated that this is merely illustrative, as the office may include any number of printers 66. The office includes several vending machines 68 that are individually labeled as 68a, 68b. While a total of two vending machines 68 are shown, it will be appreciated that this is merely illustrative, as the office may include any number of vending machines 68.

The illustrative system 62 includes an Automatic Office Assistant System 70 that is configured to receive requests for assistance from the printers 66 and the vending machines 68. The Automatic Office Assistant System 70 is also configured to communicate with any of a number of Automatic Office Assistants 72, individually labeled as 72a, 72b, 72c, 72d. In some cases, the Automatic Office Assistants 72 may be robots that are configured to resolve problems with the printers 66 and/or the vending machines 68. In response to receiving a request for assistance, the Automatic Office Assistant System 70 determines which of the Automatic Office Assistants 72 are best suited and/or best-positioned to respond to the request for assistance.

As shown, the printer 66b is providing a request for assistance that includes its precise location (e.g. within 1 centimeter, within 5 centimeters, within 10 centimeter, within 1 meter, within 3 meters, or any other suitable precision) as well as an indication that the printer 66b is out of paper. The Automatic Office Assistant System 70 utilizes 5G to communicate with the Automatic Office Assistant 72a, which has been dispatched to put paper into the printer 66b. As shown, the vending machine 68b is providing a request for assistance that includes its precise location (e.g. within 1 centimeter, within 5 centimeters, within 10 centimeters, within 1 meter, within 3 meters, or any other suitable precision) as well as an indication that at least some of the items for sale within the vending machine 68b are out of stock or nearly out of stock. The Automatic Office Assistant System 70 utilizes 5G to communicate with the Automatic Office Assistant 72b, which has been dispatched to refill items within the vending machine 68b.

In some cases, the automated asset maintenance assistants and/or automatic office assistants are configured in advance to perform predetermined maintenance tasks on certain equipment that is installed in the particular building. In some cases, this may include configuring the automated asset maintenance assistants and/or automatic office assistants with mechanical and/or electrical manipulators that are capable of performing certain physical and/or electrical operations that will be necessary to implement predetermined maintenance tasks on certain equipment that is installed in the particular building. In some cases, the automated asset maintenance assistants and/or automatic office assistants may be equipped with tools and/or supplies that will be necessary to implement predetermined maintenance tasks on certain equipment that is installed in the particular building.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A system for servicing assets in a building, the system comprising:
    a plurality of cellular network-enabled assets in a building, each of the plurality of cellular network-enabled assets configured to:
        access a cellular network in order to determine a specific location of the cellular network-enabled asset in the building via cellular triangularization;
        perform self-diagnostics on the cellular network-enabled asset;
        transmit an assistance request via the cellular network when the self-diagnostics indicates a potential problem associated with the cellular network-enabled asset, the assistance request including:
            the specific location of the cellular network-enabled asset in the building determined by the cellular network-enabled asset via cellular triangularization; and
            an indication of the potential problem associated with the cellular network-enabled asset;
    a server that is operably couplable to the cellular network, the server configured to:
        receive the assistance requests from the plurality of cellular network-enabled assets;
        formulate a service request for responding to at least some of the received assistance requests;
        assign each of the service requests to a corresponding one of one or more automated asset maintenance assistants; and
        transmit each of the service requests to the assigned automated asset maintenance assistant instructing the assigned automated asset maintenance assistant to respond to the corresponding assistance request.

2. The system of claim 1, wherein each of the service requests include an indication of the specific location of the corresponding cellular network-enabled asset ascertained by the corresponding cellular network-enabled asset via cellular triangularization, and an indication of the potential problem associated with the corresponding cellular network-enabled asset.

3. The system of claim 2, wherein the one or more automated asset maintenance assistants are mobile robots capable of autonomously traveling to the specific location of the corresponding cellular network-enabled asset in order to respond to the corresponding assistance request.

4. The system of claim 3, wherein the server identifies a corresponding Standard Operating Procedure (SOP) for at least some of the assistance requests based on the potential problem included in the corresponding assistance request, and wherein the server provides the identified SOP in the service requests that is transmitted to the assigned automated asset maintenance assistant.

5. The system of claim 4, wherein the SOP identifies one or more ordered steps to be taken by the assigned automated asset maintenance assistant when responding to the corresponding assistance request.

6. The system of claim 1, wherein formulating a service request comprises one or more of:
   determine which of a plurality of automated asset maintenance assistants should be assigned to a particular assistance request based at least in part on a current location of the automated asset maintenance assistants and/or one or more capabilities of the automated asset maintenance assistants;
   prepare additional information for the assigned automated asset maintenance assistant, including what tools or other supplies will be needed by the assigned automated asset maintenance assistant to respond to the assistance request; and
   provide a route for the assigned automated asset maintenance assistant to reach the corresponding cellular network-enabled asset.

7. The system of claim 1, wherein formulating the service request further comprises determining an appropriate time for the assigned automated asset maintenance assistant to respond to the service request.

8. The system of claim 1, wherein one or more of the plurality of cellular network-enabled assets is a building automation component having a cellular network capability built in and housed by a housing of the building automation component.

9. The system of claim 1, wherein at least one of the plurality of cellular network-enabled assets is a building automation component without a cellular network capability built in and housed by a housing of the building automation component, and a cellular network transceiver add-on operatively coupled to the building automation component.

10. The system of claim 1, wherein one or more of the plurality of cellular network-enabled assets is a building automation component, and wherein the building automation component is part of a Heating, Ventilation, and/or Air Conditioning system (HVAC).

11. The system of claim 1, wherein one or more of the plurality of cellular network-enabled assets is a building automation component, and wherein the building automation component is part of a security system, access control system and/or lighting system.

12. The system of claim 1, wherein one or more of the plurality of cellular network-enabled assets is an office appliance, wherein the office appliance is one or more of a printer, a coffee machine, a vending machine, a copy machine, a document scanner and a facsimile machine.

13. The system of claim 10, wherein one or more of the plurality of cellular network-enabled assets comprises one or more of a pump, a fan, a valve, a sensor and a controller.

14. The system of claim 1, wherein the cellular network comprises a 5G cellular network.

15. A system for servicing assets in a building, the system comprising:
   a plurality of 5G-enabled assets, each of the plurality of 5G-enabled assets configured to:
      utilize a 5G network to determine its location via cellular triangularization on the 5G network;
      perform self-diagnostics;
      transmit an assistance request via the 5G network when a potential problem is detected by the self-diagnostics, the assistance request including:
         a location of the 5G-enabled asset determined via cellular triangularization on the 5G network; and
         an indication of the potential problem associated with the 5G-enabled asset;
   a plurality of mobile asset maintenance robots, each of the plurality of mobile asset maintenance robots configured to perform one or more tasks, where at least some of the plurality of mobile asset maintenance robots are configured to perform one or more tasks that are different than the tasks that others of the plurality of mobile asset maintenance robots are configured to perform;
   a computing device that is operably couplable with the 5G network, the computing device configured to:
      receive assistance requests for assistance from one or more of the plurality of 5G-enabled assets over the 5G network;
      determine which of the plurality of mobile asset maintenance robots are suited to respond to each of the received assistance requests; and
      for each assistance request, transmit a service request to an assigned one of the plurality of mobile asset maintenance robots determined to be suited to respond to the assistance request, the service request instructing the assigned mobile asset maintenance robot to resolve the potential problem.

16. The system of claim 15, wherein the service requests include instructions for resolving the potential problem and/or directions to the location that corresponds to the corresponding 5G-enabled asset.

17. The system of claim 15, wherein one or more of the 5G-enabled assets is a building automation component, and wherein the building automation component is part of a Heating, Ventilation, and/or Air Conditioning system (HVAC), a security system, an access control system and/or lighting system.

18. The system of claim 15, wherein one or more of the 5G-enabled assets is an office appliance, wherein the office appliance is one or more of a printer, a coffee machine, a vending machine, a copy machine, a document scanner and a facsimile machine.

19. The system of claim 15, wherein one or more of the 5G-enabled assets comprises one or more of a pump, a fan, a valve, a sensor and a controller.

20. A method for servicing assets in a building, the method comprising:
   utilizing a 5G network to determine a location of a 5G-enabled asset in a building;
   performing a self-diagnostics on the 5G-enabled asset;
   transmitting an assistance request from the 5G-enabled asset over the 5G network when a potential problem is detected by the performed self-diagnostics, the assistance request including:

a location of the 5G-enabled asset determined via cellular triangularization on the 5G network; and an indication of the potential problem associated with the 5G-enabled asset;

receiving the assistance request at a location remote from the 5G-enabled asset over the 5G network;

assigning a mobile asset maintenance robot to respond to the assistance request; and transmitting a service request to the assigned mobile asset maintenance robot, the service request instructing the assigned mobile asset maintenance robot to travel to the location of the corresponding 5G-enabled asset and perform a predefined Standard Operating Procedure (SOP) to resolve the potential problem.

* * * * *